United States Patent

Brotz

[11] Patent Number: 5,072,215
[45] Date of Patent: * Dec. 10, 1991

[54] THREE-DIMENSIONAL IMAGING SYSTEM

[76] Inventor: Gregory R. Brotz, P.O. Box 1322, Sheboygan, Wis. 53081

[ * ] Notice: The portion of the term of this patent subsequent to Jan. 23, 2007 has been disclaimed.

[21] Appl. No.: 454,389

[22] Filed: Dec. 21, 1989

Related U.S. Application Data

[63] Continuation-in-part of Ser. No. 182,920, Apr. 18, 1988, Pat. No. 4,896,150.

[51] Int. Cl.⁵ .............................................. G09G 3/00
[52] U.S. Cl. .................................... 340/795; 340/729
[58] Field of Search ............... 340/794, 795, 705, 729, 340/755; 364/522; 358/88-92, 3, 903; 350/608, 611, 144

[56] References Cited

U.S. PATENT DOCUMENTS

| | | | |
|---|---|---|---|
| 2,777,011 | 1/1957 | Marks | 358/88 |
| 3,204,238 | 8/1965 | Skellett | 313/461 |
| 3,493,290 | 2/1970 | Traub | 340/755 |
| 3,555,349 | 1/1971 | Munz | 358/88 |
| 3,636,551 | 1/1972 | Maguire | 358/88 |
| 4,041,476 | 8/1977 | Swainson | 340/795 |
| 4,130,832 | 12/1978 | Sher | 340/755 |
| 4,359,758 | 11/1982 | Teacherson | 358/90 |
| 4,376,950 | 3/1983 | Brown et al. | 358/90 |
| 4,408,277 | 10/1983 | Cortellini et al. | 358/90 |
| 4,442,455 | 4/1984 | Huignard et al. | 358/90 |
| 4,472,737 | 9/1984 | Iwasaki | 358/88 |
| 4,566,031 | 1/1986 | Kirk | 358/90 |
| 4,896,150 | 1/1990 | Brotz | 340/795 |
| 4,922,336 | 5/1990 | Morton | 358/88 |

Primary Examiner—Jeffery A. Brier
Attorney, Agent, or Firm—William Nitkin

[57] ABSTRACT

A three-dimensional imaging system having a viewing chamber in one embodiment with electrode vibration plates disposed above and below the viewing chamber with a plurality of minute particles having a changeable charge moving rapidly back and forth between the vibration plates and in another embodiment having a moving screen in the viewing chamber with illumination of selected of the particles or screen provided at a desired height in the viewing chamber at a plurality of positions within the viewing chamber to produce a three-dimensional image based upon an image-sensing device's output directed to control the points of illumination within the viewing chamber.

1 Claim, 6 Drawing Sheets

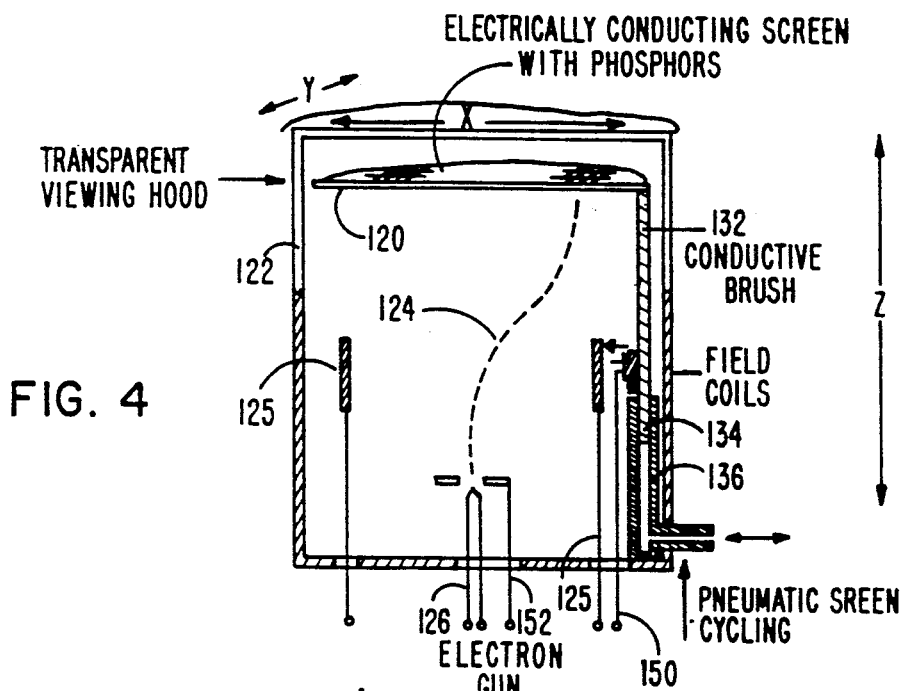
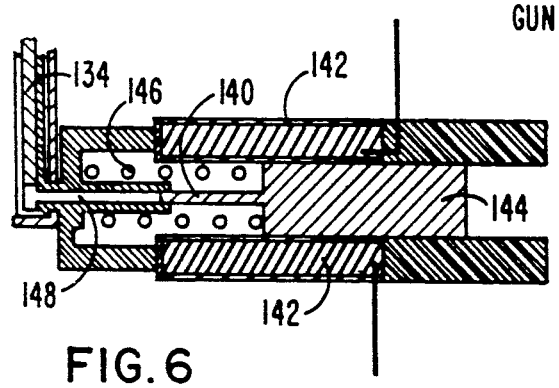
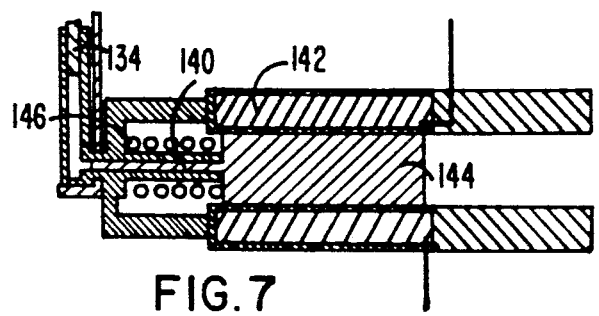
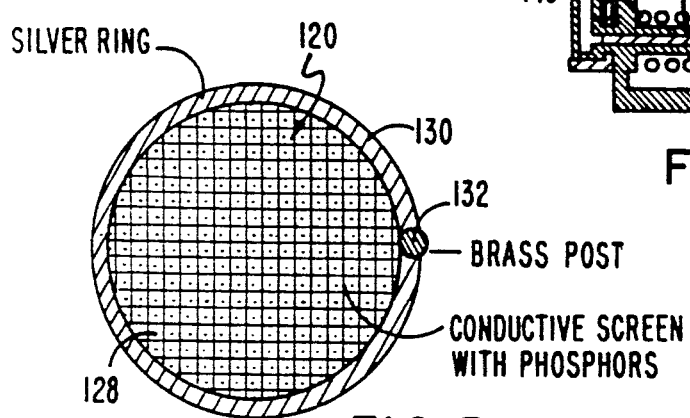

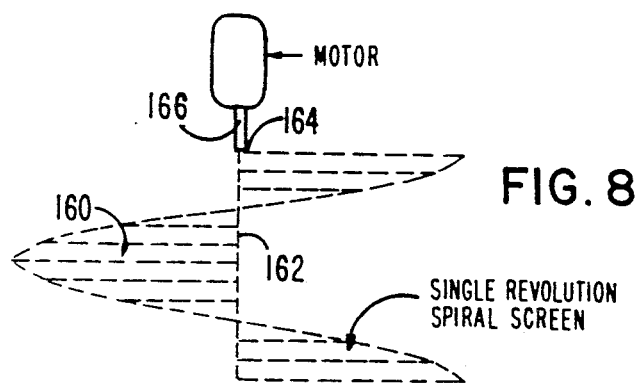
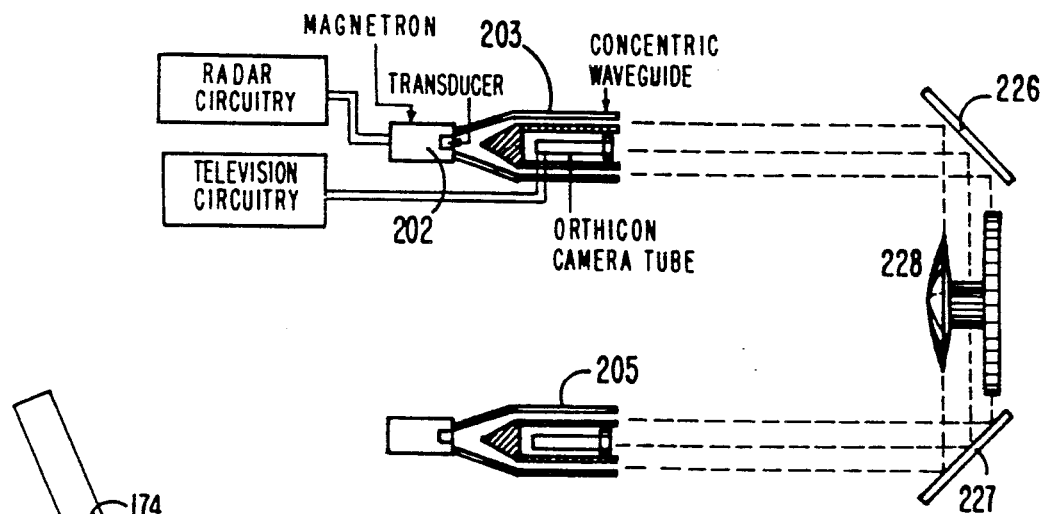
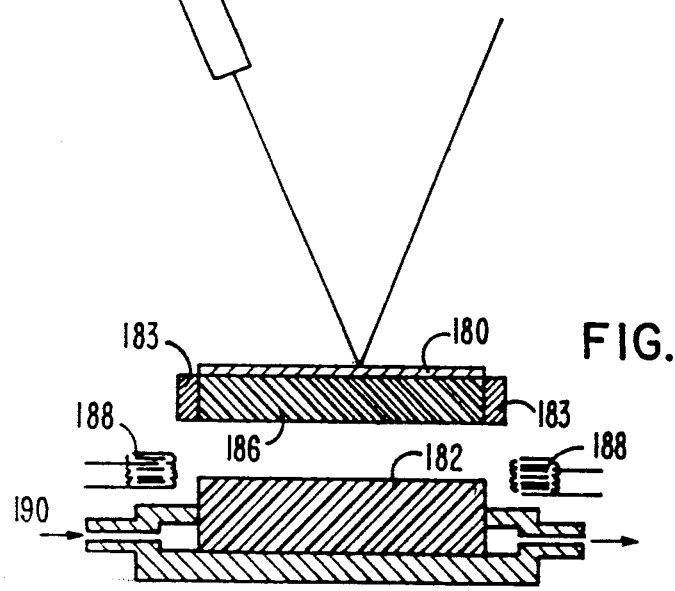

THREE-DIMENSIONAL IMAGING SYSTEM

This application is a continuation-in-part of my previous application under the same title, Ser. No. 182,920 filed Apr. 18, 1988, now U.S. Pat. No. 4,896,150.

BACKGROUND OF THE INVENTION

1. Field of the Invention

The system of this invention resides in the field of three-dimensional imaging and more particularly relates to a system to create a televised three-dimensional image.

2. Description of the Prior Art

There has been much work in the past directed toward the production of a televised three dimensional image which does not rely on the viewing of different images by each eye of the viewer, which viewing now requires the viewer to wear special glasses to cause each eye to see only one of such images. It has been desired to have a three-dimensional image which is viewed normally by an observer without special glasses. Toward that end many holographic systems have been developed, for example Three-dimensional Television System Using Holographic Techniques, U.S. Pat. No. 4,376,950 to Brown which illustrates a system of holograms which are observed in three dimension. Other holographic systems have also been presented such as Holographic Television by Teacherson, U.S. Pat. No. 4,359,758 which also uses holographic images for the production of a television image. More complex systems have tried to create images from holographic systems where the image is angularly multiplexed over a series of matrixes of dot members supported by wires in a number of planes. Such a system is found in U.S. Pat. No. 4,408,277 to Cortellini et al for A Holographic Imager which illuminates points on selected of a series of such matrixes. Other systems incorporate in their structure wave detection materials which have plates which can be electrically conductive with a contained area of thin liquid medium, of a type of material which is affected by a scanning beam against the plate causing portions of the medium contained therein struck by such beam to become transparent. Such plates with mediums interacting with signals have been used in combination with other equipment to produce a display such as seen in U.S. Pat. No. 4,442,455 to Hulgnard entitled Optical System for Observation in Real Time with Scanning. Similar plates have also disclosed in U.S. Pat. No. 4,566,031 issued to Kirk for Spatial Light Modulation with an Application to Electronically Generated Holography. The medium between these plates is generally opaque until activated wherein it becomes transparent for the transmission of light. The Kirk patent uses dipolar particles which are activated between a plurality of plate members for data signals to be derived from the entire structure.

SUMMARY OF THE INVENTION

It is an object of this invention to provide a new system for the production of a directly viewable three-dimensional image. To accomplish this a viewing chamber is provided with electrodes above and below such chamber as will be described below. The viewing chamber containing a large plurality of charged vibrating particles moving in a plane back and forth between the electrodes at a fast rate. These particles are selectively sequentially illuminated by the system of this invention and an image is formed in the chamber which can be viewed by an observer.

It is a further object of this invention to provide a viewing chamber which receives television signals and which can produce the image of those signals in a directly viewable three-dimensional image form.

An object to be viewed in three-dimension in the viewing chamber of this invention is, in one embodiment, photographed simultaneously at different angles by at least two television cameras. More television cameras could be utilized as well as other image-sensing means as described below. The images from these television cameras are processed by a computer and, in one embodiment, are digitized to control a laser the output of which is directed on the viewing chamber of this invention in a sequence of positions by a rotating and pivoting mirror also controlled by such computer. The viewing chamber of this invention which will be described in further detail below receives such laser beam output thereon and produces a three-dimensional image therein viewable directly by an observer. The viewing chamber, in a first embodiment, contains first and second spaced-apart transparent electrode vibration plates between which is suspended in a vacuum a large plurality of minute charged particles which are made to vibrate in a flat plane between the two electrodes' vibration plates at approximately 8 cycles/second using high voltage or static discharge between the electrode vibration plates. The electrode vibration plates have a sufficient charge thereto to maintain the pulsing plane of particles in a high state of static charge therebetween so that such particles are dispersed evenly throughout the moving plane of particles. The viewing chamber can be optically transparent so that between the plates an observer from a side or end can view the area containing the suspended particles but the plane of moving particles will not be visible because of their small size until they are illuminated. When a beam, such as a laser beam strikes the transparent electrode vibration plate, it passes therethrough and strikes a particle(s) in the moving plane of particles when it moves to a desired height in the viewing chamber thus illuminating that particle(s). As the laser beam is pulsed in relation to, for example, a cathode ray tube output derived from a television cameras, the beam is directed by a rotating and moving mirror to a sequential series of positions on the electrode vibration plate. As the rotating mirror directs the pulsed beam made up of a series of discrete pulses to a large number of positions from side-to-side and front-to-rear on the electrode vibration plate, the particles in the path of each beam are illuminated. The position of the plane of particles determines the height in the chamber of the illuminated spot. An image is produced within the viewing chamber when many spots are illuminated at close time intervals which image can be perceived through the viewing chamber's transparent sides. Colored three-dimensional images can also be produced as will be described below.

In another embodiment carbon electrode plates can be disposed immediately exterior to each electrode vibration plate. The carbon electrode plates are maintained at a voltage that is just below that voltage necessary to produce a spark arcing between the carbon electrode plates. When a beam, such as a laser beam, strikes the outer carbon electrode plate, the spot where the beam strikes the carbon electrode plate causes the temperature of that spot to rise which local higher temperature causes an increase in the electrical conduction of that spot which in turn causes a spark arc to form from that spot to the opposite carbon electrode plate. Selected particles in the viewing chamber are illuminated by each spark-arc ionizing those particles in its path. The moving mirror as described above can direct the beam to a desired position on the carbon electrode plate to cause a spark arc to form at each position between the two carbon electrode plates, and a large number of arcs is created within a short time period in the viewing chamber.

In a further embodiment of the viewing chamber, the electrodes can be positioned on both ends of an upright cylindrical transparent viewing chamber. A typical cathode ray tube-type image signal can be directed against one end of the viewing chamber. Such signal can be controlled as any scanning television image beam but when such beam, which would normally activate the phosphors at the front of a television screen, strikes the bottom end of the cylindrical viewing chamber against the carbon electrode plate, it decreases the resistance of the carbon electrode plate where struck by the signal beam causing a spark arc to occur as described above with the local ionization and illumination of a spot in the plane of particles at its desired position within the chamber in the path of the arc. In this way the viewing chamber can be directly activated by the electron beam of a cathode ray tube to produce a three dimensional image when viewed from the side. As the beam scans the carbon electrode plate, a series of arcs would occur with accompanying particle illumination. In this way the beam is pulsed and scanned synchronously according to the incoming image information and which beam causes the carbon electrode plates to produce spark arcs to cause illumination of the particles at the desired plane position in such arcs' paths as described above causing the particles therein so illuminated to create an image. The sides of this cylindrical structure can be of transparent material so that the image could be viewed from any side.

To produce colors in the direct laser illumination of the particles embodiment, the viewing chamber of this invention can be activated by red, yellow and blue laser beams which receive image information from an image source such as through a camera through a computer which controls the pulsing of the beams through a synchronizer. Each laser can provide a beam that reflects a different color off the particle(s). Each laser can direct its pulsed beam directly or through a series of mirrors to the mirror scanner which can rotate to direct the beam to illuminate desired particle spots. The colors of the beams can be combined in various combinations to produce all colors.

Other types of viewing screens can also be utilized in this invention. A planar screens that is moved back and forth rapidly within the viewing area can be used as well as a spiral screen which is rotated within the viewing area on a central shaft where due to the spiral shape of the spiral screen at some point in the rotation every point in the viewing chamber is occupied by a portion of the rapidly rotating screen. The screen is struck by the beam as directed by a rotating mirror as described above or by a floating mirror. The floating mirror can be a mirror which is mounted on a material that is held levitated above a superconductor, such mirror having peripheral elements which are moved by field coils sequentially activated thereunder which operation provides for frictionless mirror movement as will be described further below.

BRIEF DESCRIPTION OF THE DRAWINGS

FIG. 4 illustrates a cross-sectional view of a chamber having a movable screen.

FIG. 5 illustrates a top view of the screen of FIG. 4.

FIG. 6 illustrates the pneumatic piston in a first position to move the screen of FIG. 4.

FIG. 7 illustrates the pneumatic piston of FIG. 6 in a second position.

FIG. 8 illustrates a side view of the spiral screen of this invention

FIG. 11 illustrates two cameras similar to the type shown in FIG. 10 with scanning mirrors to obtain a three-dimensional image with depth information of both sides of an object.

FIG. 12 illustrates a cross-sectional view through a mirror levitated above a superconductor with coil control means.

DESCRIPTION OF THE PREFERRED EMBODIMENT(S)

Figure 1:
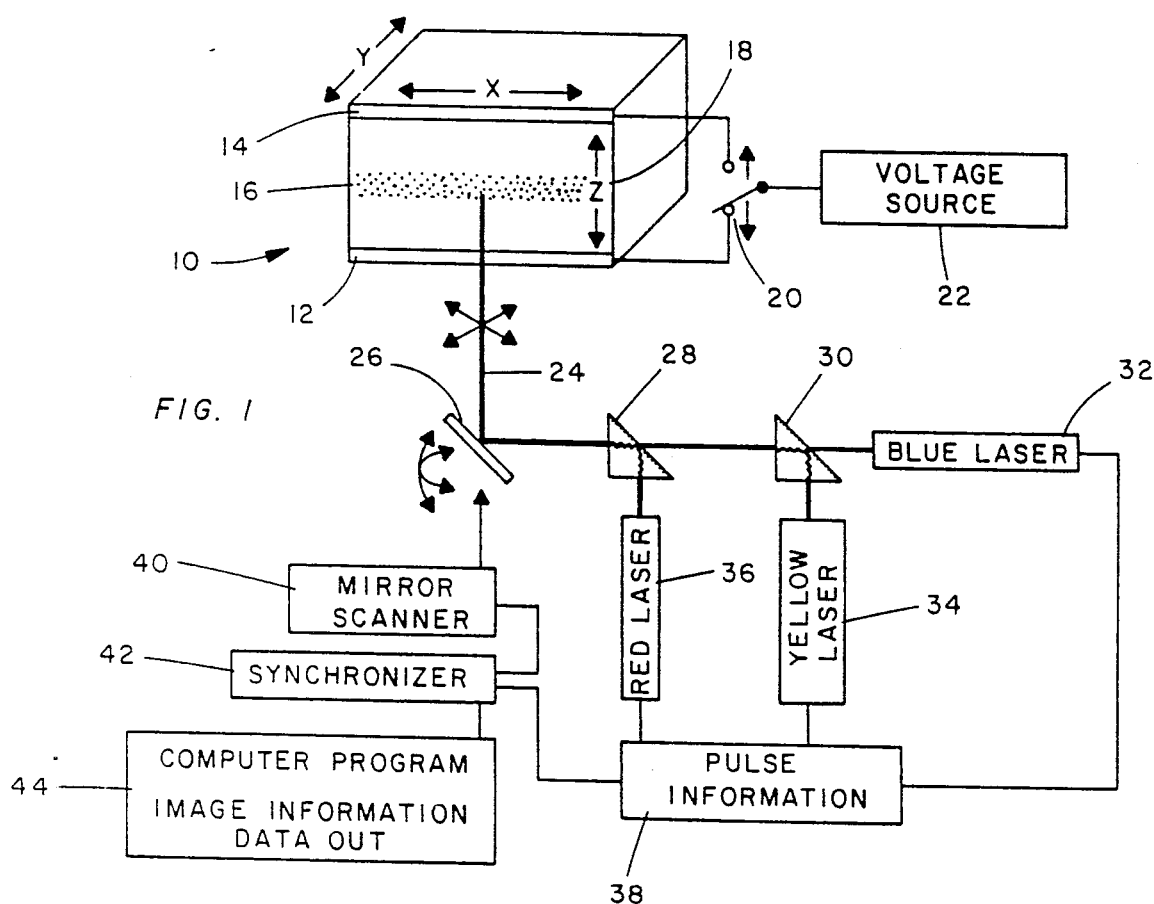
FIG. 1 illustrates a viewing chamber of this invention with a series of lasers for direct particle illuminations, such lasers correlated to produce a color image.
Figure 2:
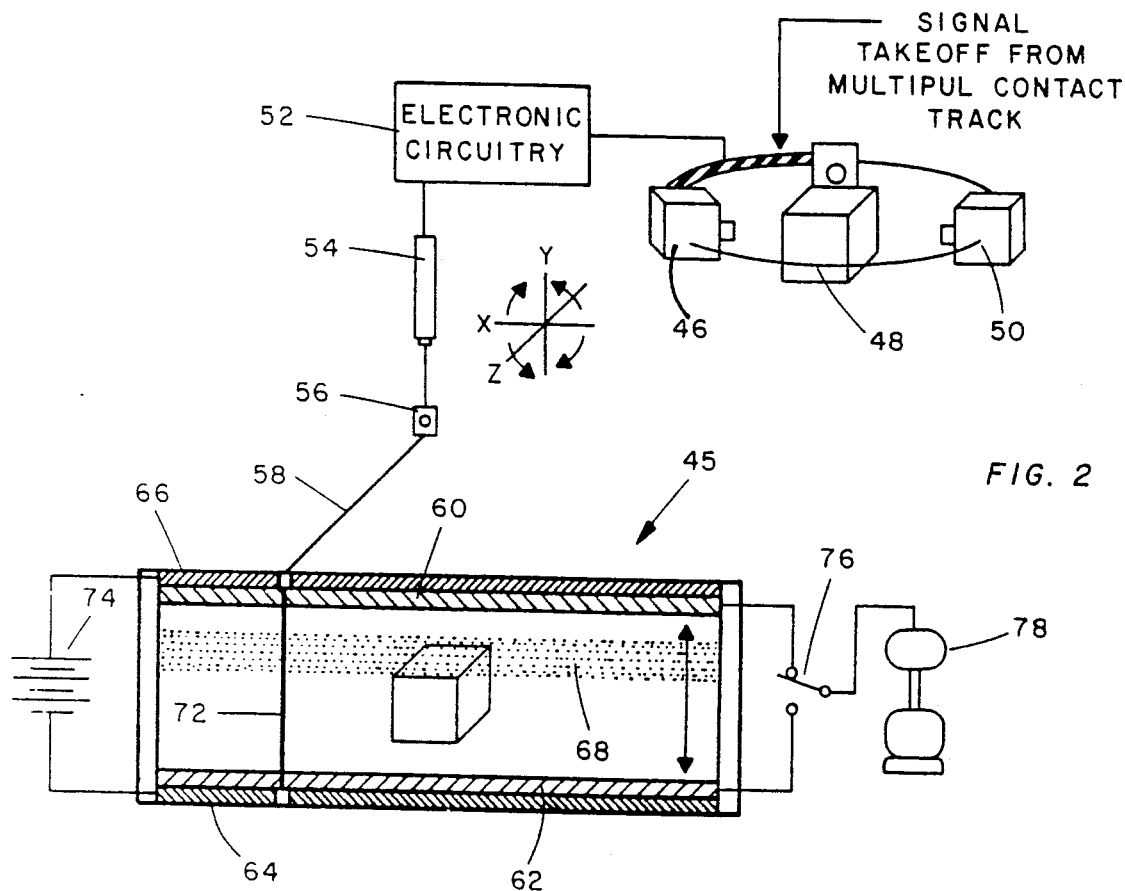
FIG. 2 illustrates a side cutaway view of a viewing chamber of this invention utilizing spark arc illumination.

FIG. 1 illustrates a side cutaway view of viewing chamber 10 of this invention which has contained therein a plurality of minute charged suspended particles 16 arrayed in a plane. The front of the chamber facing the viewer is transparent and the chamber is seated with a vacuum therein. At the top and bottom of the chamber are first and second transparent electrode vibration plates 12 and 14, respectively. These electrode plates which can be made of a conductive transparent material such as natural crystal or equivalent are adapted to keep particles 16 suspended in a moving narrow plane within the viewing chamber by providing between the first and second electrode vibration plates 12 and 14 a series of static or high voltage alternating charges within the chamber. The electrode vibration plates could also be made of a sandwich of thin glass containing a conductive fluid such as salt water or of a clear conductive material such as polyacetylene. To accomplish this moving suspension, a static generator or high voltage generator 22 provides a current to electrodes 20 where the current direction of the electric charge changes at the eighth cycle/second rate. The current direction changes cause the plane of particles 16 to move rapidly back and forth between electrode vibration plates 12 and 14. At any position as they move the particles are not yet visible because they are so minute. The particles are not visible unless light is shined upon them or they are activated in some other way to illuminate. The particles are suspended in the chamber not only through the entire length of the visible chamber but also through the depth of the chamber extending away from the viewer. Viewing chamber 10 has a length X and a depth Y and a height Z. The length X along the top and bottom electrode vibration plate 12 and 14 runs along the length of the front viewing surface. The depth Y extends to the depth of the electrode plates and the height Z is the spacing between the plates through which the suspended particles 16 move back and forth in a plane as illustrated. These particles 16 are adapted to be struck by light directed from a source. Once struck by light from a source, they are visible in the same way that dust particles may be visible in a room when struck by sunlight but are invisible because of their minute size when not illuminated. By directing a light beam on the electrode vibrating plate which is transparent, the light passes therethrough at a desired point to strike a single or group of particles of the suspended plane of particles 16 creating an illuminated spot. Along the X-Y axis one can orient the position of the spot's illumination and when determining the proper height of the particle plane 16 on the Z axis, one can position the illuminated spot not only at any height in the chamber but at any depth. When one illuminates a large number of particles in a very fast sequence, one can create an image within the chamber that is three-dimensional in appearance because it has all the components of length, depth and height to the image. In a direct illumination chamber 10, the light spot can be directed thereto by a variety of means including a rotating and moving mirror such as mirror 26. Other equivalent means could be utilized to direct the light spots from a mirror and many types of imaging beams, as long as they produce light on the spot, could be utilized as will be discussed below. The rotating mirror 26 aims a beam such as one from a laser to a spot on the X-Y axis of viewing chamber 10 and when the particle plane 16 is at the proper height Z within the chamber, the beam is pulsed and the spot desired is illuminated. As mentioned, by illuminating many of these spots, an image that is three-dimensional can be formed which can be directly viewed by an observer. In order to create such images, many techniques of image creation can be utilized. One such technique is seen in FIG. 2 a photographic cameras 46 and 50 photograph an object 48 which is a cube. The image information is processed by a computer 44 through electronic circuitry and that image information is digitized and directed by a synchronizer 42 first to control the movement of the mirror scanner 26 to aim a beam 24 at the proper X-Y coordinates and the synchronizer 42 then controls the pulse information 38 to, for example, a series of lasers such as lasers 32, 34 and 36. The pulse information 38 directs a pulse to be made at the time when the plane of particles 16 is at the proper height Z, and when so pulsed, a spot in viewing chamber 16 is illuminated. By controlling the combination of mirror movement and pulsing, one can create a visible image within the viewing chamber of this invention. In order to create colors, one can utilize a series of colored lasers such as red laser 36, yellow laser 34 and blue laser 32 which are reflected through half-silvered mirrors, for example mirrors 28 and 30, in order to direct all of their beams to the same point on mirror 26. The blue laser projects through half-silvered mirrors 28 and 30 while the beams of yellow laser 34 and red laser 36 are reflected off the inner reflective surfaces of mirrors 28 and 30 to mirror 26. In this way combinations of the various colors of the laser beams can be additively made so as to create a final color of the pulsed beam to create a colored image. For example, if the image spot is red, then the red laser would alone pulse the beam off mirror 26 to the spot through vibrating electrode 12. If the image spot is to be green, both the blue and yellow lasers would combine their beams in a combination of color to create the green image. By combining all the colors in the well-known additive type of color imagery, any color can be created to reflect off a particle moving within the particle plane 16.

Electronic circuitry 52 processes the image information from the cameras to determine by ranging between the two images the height, length position and depth of all spots within the systems resolution and processes these to be duplicated by the pulsed lasers aimed by the mirror in coordination with the particle plane height in the viewing chamber. Other image sensing means could be used to determine such spot positions such as scanning radar or sonar equivalents. Colors can be determined also by cameras to enhance each image spot with color.

In FIG. 2 a similar scanning mirror 56 projects its beam 58 onto the top of viewing chamber 45 wherein the vibrating electrode members 60 and 62 propel the planar particles 68 back and forth on the Z axis within chamber 45. In this chamber, though, there is no direct illumination because located above first and second electrode vibration plates 60 and 62 are carbon electrode plates 64 and 66. The carbon electrode plates extend over and under the entire length and depth of the viewing chamber. Both carbon electrode plates 64 and 66 have a voltage power source 74 interconnected therebetween which provides the minimum charge necessary to almost cause a spark to jump between the plates through the viewing chamber 45. Upper carbon electrode plate 66, though, will produce a spark gap at any point on its surface between the electrode plate 66 and carbon electrode plate 64 should there be any local spot temperature rise on its surface which lowers the resistance and creates a higher conduction at that particular point. Should the temperature rise on any particular point of carbon electrode plate 66, spark arc 72 will pass through the viewing chamber and such spark arc will ionize the particles in the particle plane 68 in its path to cause the particles to produce light which would be visible from the side of the chamber. In order to produce an image, upper carbon electrode plate 66 is struck at a plurality of positions in a very fast sequence by a beam such as produced by laser 54. The laser produces a signal as directed by the multiple television cameras 46 and 50 which are disposed around object 48 being photographed by such cameras. Electronic circuitry 52 processes the images received from television cameras 46 and 50 of object 48 and also controls the rotating and moving mirror 56 and the pulsing of laser 54. In this way .he image is broken down by electronic circuitry 52 which then causes the laser to pulse a beam and the mirror to direct such beam to a position on upper carbon electrode plate 66. As mirror 56 rotates, it aims the series of discrete beam pulses 58 and the points where the pulses land on carbon electrode plate 66, the temperature at those locations increases and the resulting higher conduction causes a spark arc 72 to jump between the first carbon electrode plate 66 and the second carbon electrode plate 64 creating the illuminized particles as described above. Speedy scanning movement of the mirror to direct the beam to a large number of positions very quickly creates a large number of spark arcs and particles illuminated by the ionization by the arc within the viewing chamber 45. Since the image forming area not only has width but also depth and height, the image will appear 3-dimensional because of the signals taken from the camera as processed by electronic circuitry 52. Laser 54 can radiate in the infrared spectrum to create a localized spot increase in temperature in the upper carbon electrode plate 66. In this way a spot on the vibrating plane of particles 68 is ionized at a desired height and illuminated for the period of time that the arc is passing therethrough. Once the beam 58 that is directed by mirror 56 moves to the next spot on the carbon electrode plate, the ionized particles in the first arc will cease to produce light and the next group of illuminated particles will. In this way the beam can quickly scan the entire upper surface of the carbon electrode plate 66 as would a scanning beam on a television screen with a large number of beam directed per second and an image will be created as viewed rom the side. It should be noted that the viewing chamber can be of various sizes and shapes, not necessarily the size that is illustrated herein.

Figure 3:
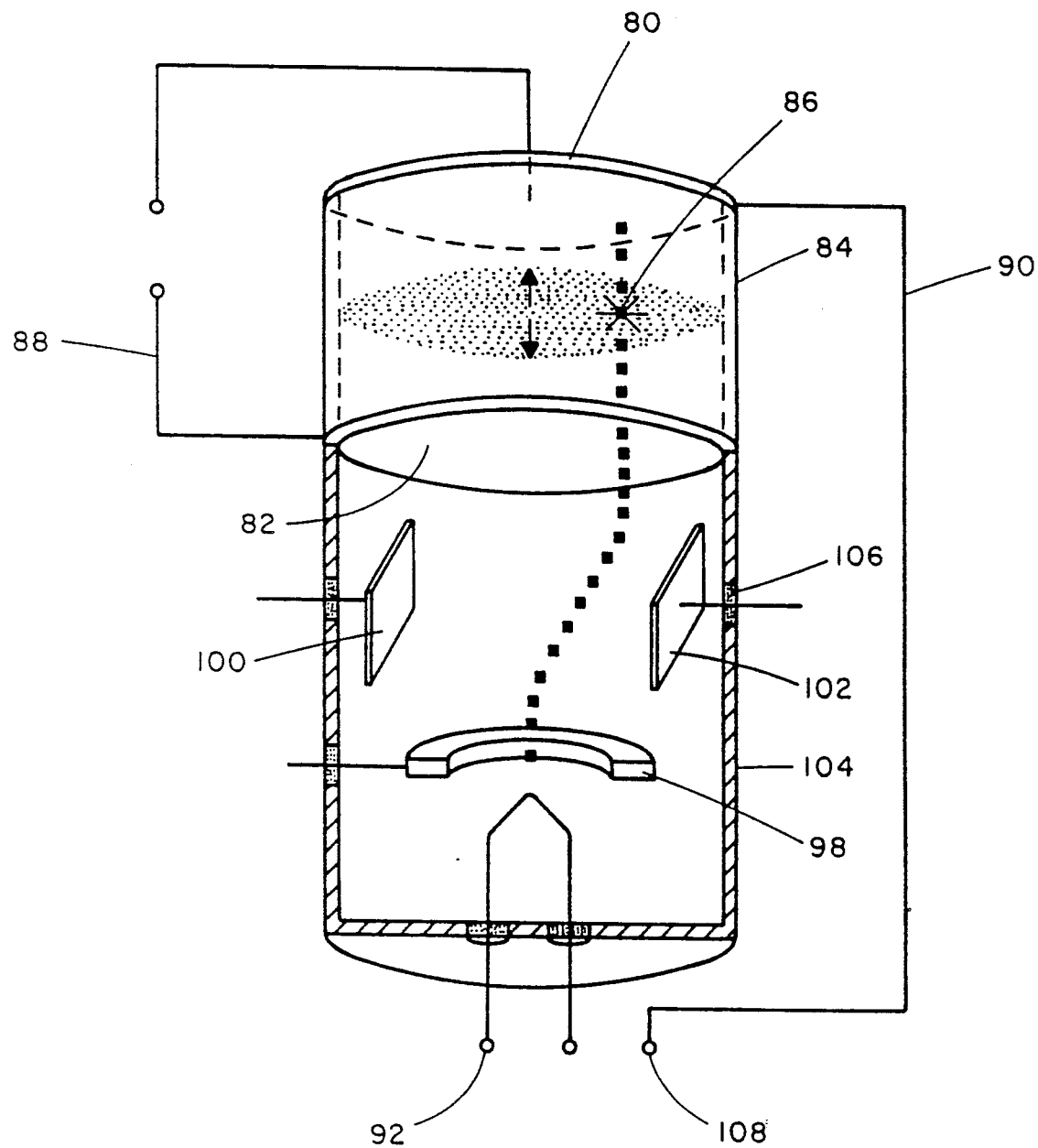
FIG. 3 illustrates an alternate embodiment of the device of this invention wherein the viewing chamber is activated by the beam of a cathode ray tube.

FIG. 3 illustrates a further alternate embodiment wherein an upright cylindrical chamber 84 is provided at the end of tube 104 which is similar to the cathode ray-type tubes in a normal television screen. If such chamber were disposed so that the particle plane were moving at an angle, the plane might not have even movements due to the force of gravity. In this version the sides of the chamber 84 can be transparent as well as the end of chamber 80 which is comprised of a carbon electrode plate and the electrode vibration plates as described above. Also bottom carbon electrode plate 82 is further comprised of a carbon electrode plate and an electrode vibration plate with the charge alternating at 8 cycles/second from contact point 88 to maintain the particles 86 in suspension within viewing chamber 80. The power source to carbon electrode 90 can also be controlled by the cathode ray-type tube as can part of the electrode to the lower carbon electrode plate. Field coil 98 with carbon electrode plates 101 and 102 control the cathode ray image beam which is directed against the bottom of carbon electrode plate 82 which beams heat then causes the spark arc to form within the viewing chamber and the arc then proceeds through the chamber ionizing the particles in the plane in its path which illuminated particles can be viewed from the sides or top of chamber 80 depending on the nature of the signal produced by the cathode ray tube which would be directed by the computerized information provided thereto. In this way the image within the viewing chamber can be directly controlled by a cathode ray tube scanning its beam thereagainst. It should be noted that the carbon electrode plate that is first struck can be conductive or insulative and since at high voltages most materials will conduct, the carbon electrode plates do not have to be as electrically conductive as the electrode vibration plates and such carbon electrode plate being struck by the beam can have insulative qualities. It should be further noted that the outer carbon electrode plate and vibration plate in the embodiment illustrated in FIG. 3 can be made of materials that are transparent for viewing from the top depending upon the nature of the image orientation as provided by the computerized control of the system.

Basically there are two types of particles, those with a constant or permanent charge and those which change their charge. Particles with a constant or permanent charge can be insulators such as small pieces of expanded polystyrene and the charge of the plates continually changes from positive to negative to drive the particles back and forth. When using particles which can change their charge, the plate's polarity remains constant as the particles when they contact the plate take on the charge of such plate and are then repulsed to the opposite plate where such process is repeated. For example, particles made of metal such as minute pieces of aluminum foil can be utilized where the weight to surface area ratio determines the charge density which then helps determine the particle speed because in a vacuum chamber the particle's speed will very much depend upon its mass. It should be noted that different metals take charges faster than other metals. Further, particles may be imparted wave motion by increasing electric fields in coils placed around the viewing chamber to achieve greater particle density in portions of the viewing chamber by causing the waves of particles to move within that area.

FIG. 4 illustrates a cross-section of an alternative embodiment of the device of this invention which does not rely on particles moving in a plane but instead relies upon a phosphor-coated screen 120 which moves through viewing chamber 122 which screen when struck by electron beam 124 directed from a source such as electron gun 126 along the X and Y axes produces a visible image by the action of the electron beam on the phosphor as described above depending upon where the screen member is within height Z of the chamber. When the moving screen is struck by light from a light source instead of an electron beam as described above, the portion of the screen struck by light becomes visible. Screen 120 seen in a top view in FIG. 5 can be made of conductive mesh 128 costed with a phosphor that will become visible when struck by electron beam 124 such as discussed previously in this disclosure. Silver ring 130 can extend in a circle as a frame to support conductive mesh 128 although other frame shapes can be employed to hold the edges of the mesh. The frame can ride upon post 132 made of a material such as brass which is moved rapidly up and down along the Z axis pneumatically or by equivalent motive means within the area of viewing chamber 122. Post 132 on which screen 120 is carried can form one electrical pole and can be maneuvered pneumatically with its bottom portion seen in FIG. 4 acting as first piston 134 within piston chamber 136 as seen in FIG. 4. As seen in FIGS. 6 and 7, second piston 140 which can be magnetically moved like a solenoid by current directed to magnets 142 surrounding the larger portion 144 of second piston 140 causing it to move forward compressing spring member 146 as seen in FIG. 7 which piston 140 compresses air within cylinder 148, such compressed air then forcing first piston 134 upwards. Since cylinder 148 is a closed system, when the current to magnets 142 cycles off, second piston 140 moves rearward forced by spring member 146 thereby pulling second piston 140 rearward in cylinder 148 which movement then causes first piston 134 to be forced downward by the vacuum created thereunder as seen in FIG. 6. This pneumatic cycling will force screen 120 up and down within viewing chamber 122 of the invention to the desired position where it will be struck by electron beam 124 from electron gun 126, the positioning of which beam can be controlled by field coils 125. The screen made of phosphor-coated conductive mesh will move up and down in electrical contact with support post 132 with one electrical pole 150 interconnected therewith and with the electron emission gun passing into the vacuum of the chamber interconnected to the opposite electrical pole 152.

Other devices can be used to move the screen up and down within the viewing chamber, but a solenoid-operated device using air is desirable as its use eliminates the noise that would occur due to vibration if strictly mechanical components were utilized. It is desirable that the movement of the screen be as quiet and as vibration-free as possible so that the image can be clearly formed in focus. Any extraneous vibrations could cause distortions in the image.

The air-operated solenoid-type piston system can utilize high voltages and can be made of a porcelain or ceramic agglomerate. The voltages needed to produce piston action that will move the screen at the correct cycles per minute are in the range of 10,000 volts to approximately 100,000 volts. It is therefore necessary for the guide post assembly to be made as lightweight as possible. The piston and cylinder could also be made out of glass or graphite respectively. Ring 130 around screen 128 can be made of silver or equivalent material to be more conductive than brass guide post 132 in order to provide that the space that the electrons pass through is as uniform as possible so that the beam reacts true rather than being attracted to other elements in the chamber. The brass guide post, being less conductive than the ring and screen mesh, allows the electron beam to be more attracted to the screen than to the guide post. It should be noted that most of the parts of the viewing chamber should be made of electrically insulative material as recited above. If necessary, an extremely flexible or limp electrical wire could be connected to the screen retainer ring as one pole of the hot wire segment of the emission gun. It is important that the mechanics of the screen movement be free of any whip and that there be no bending of the non-supported end of the screen. The magnetic coil 142 can be made of carbon fibers molded inside of an electrically insulative and magnetically transmissive plastic or glass which would provide a low friction ratio between the glass cylinder and the graphite piston. Oilite or other equivalent lightweight fused particulate having a low coefficient of friction with the cylinder material is another material that the guide piston could be made of that is sufficient to support the screen. The cylinder material and the material insulating the electrically conductive core material can be molded and wound together in one form and mixed in some cases with a low viscosity resin hardened by an ultraviolet light.

The screen in another embodiment can be spiral screen 160 as illustrated in a side view in FIG. 8. Spiral screen 160 can be rotated on a central shaft 162 before the eye. Because of its form, spiral screen 160 at certain points in time will reach all z axis positions within the viewing chamber. Beams can be directed thereagainst when the particular portion of the screen desired to be struck has reached the desired position in depth on the Z axis within the chamber. Because the spiral screen will be spinning at a high rate, all image points will be reached many times per second and the screen itself would be invisible to the eye because of its high rate of spin. The spiral screen can be conductive and made of the same phosphor coated mesh material as the flat screen discussed above.

In another embodiment the spiral screen can have a partial conductive silver coating. Such spiral screen would be rotated within a transparent vacuum viewing chamber as in the prior embodiments and shaft 162 could form the electrical connector for the pole of the screen. There would be provided a synchronized switching of the pole to ground so that when the electron beam hits the furthest away area of the screen, the beam would not then be reflected or collected by a closer area of the screen. It should be noted that more than one electron gun can be utilized to activate different portions on the screen at any particular time. Such guns could be aimed from different directions for different effects. The electron beams used can have both visual and distance data incorporated therein and in some embodiments the spiral screen can be axle-less. In this embodiment the axle-less screen can be made of a stiff material attached at position 164 to motor shaft 166.

Figure 9:
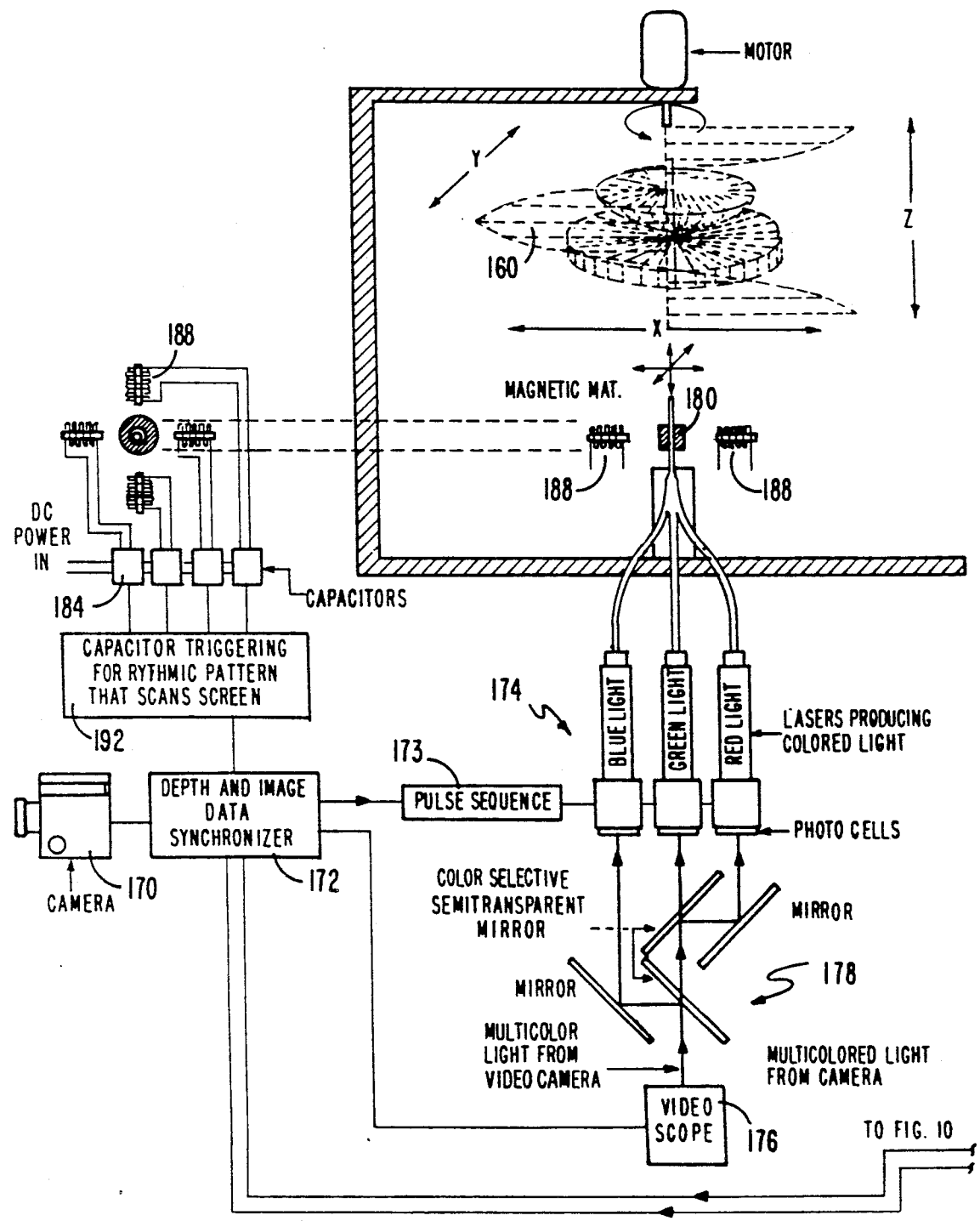
FIG. 9 illustrates a spiral screen in operation within a viewing chamber and both light sequencing and mirror movement systems.

FIG. 9 shows a typical system using a rotating spiral screen 160 where the image signal from camera 170 is sent to a Depth and Image Data Synchronizer 172 which first sends the pulse sequence to the blue, green and red lasers 174 and where a second color sequence signal is directed to videoscope 176 where the light is reflected through semi-transparent mirrors 178 as described above for additive color creation in the desired sequence and these lasers direct their output to rotating mirror 180.

Figure 10:
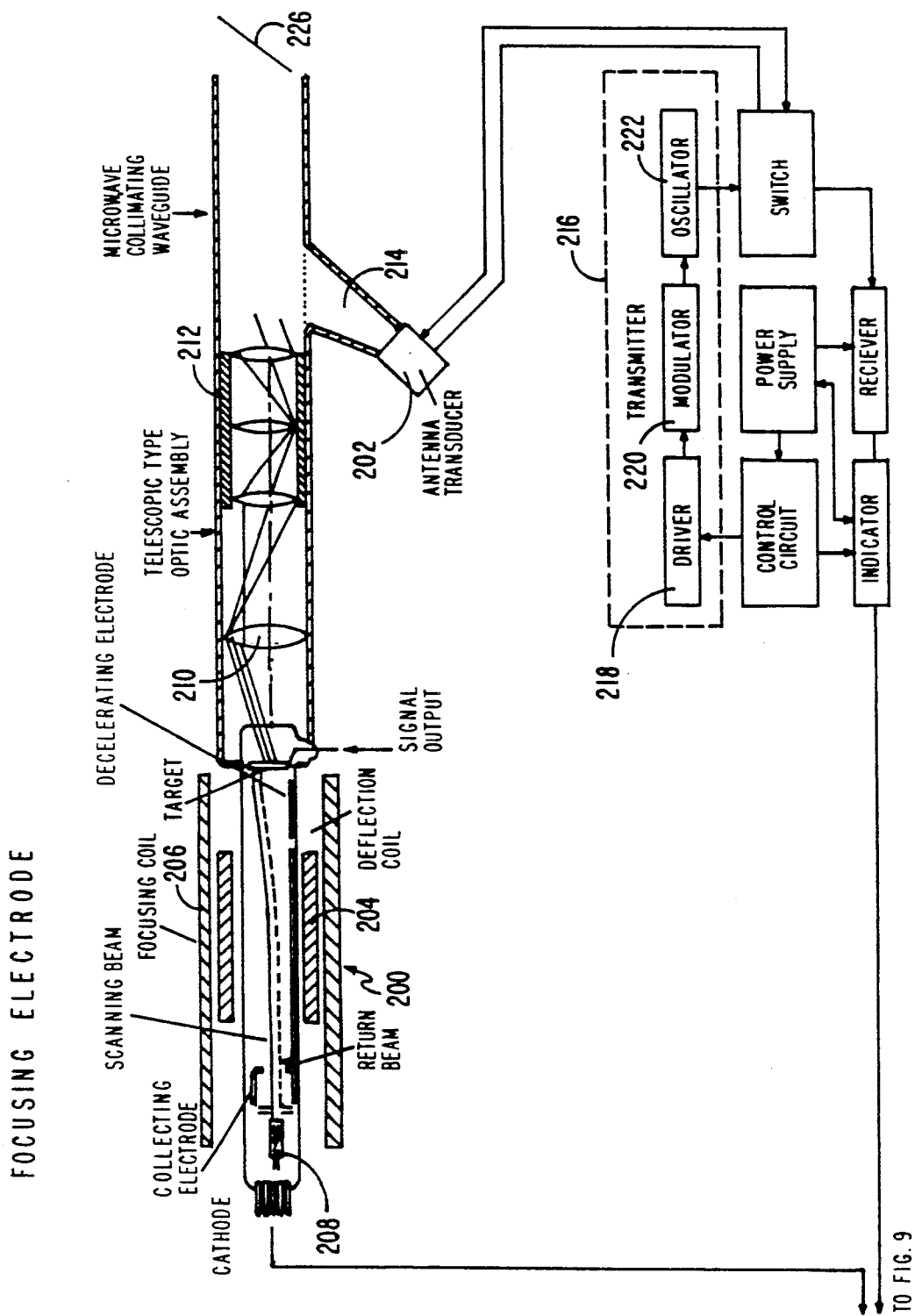
FIG. 10 illustrates an image and depth sensing camera sending its signal to the system illustrated in FIG. 9.

In order for the light beam to be pulsed when the screen is at the desired depth on the Z-axis, the Dept and Image Data Synchronizer 172 must include both factors of image position first on the X,Y axis and secondly, to synchronize the depth position on the Z axis to determine when and where the light beam is to be directed at the rotating spiral screen. Television camera 170 including not only an orthocon-type tube 200 but also a depth detector 201 such as a radar or sonar system can be utilized. As seen in FIG. 10, the orthocon tube has typical deflection coils 204 and focusing coils 206 therearound with cathode 208 at the end of the tube interconnected to the Depth and Image Data Synchronizer 172 seen in FIG. 9. The image is formed by lens assembly 210 which lens assembly is within narrow microwave culminating wave guide tube 212. Also within wave guide tube 212 is second tube 214 extending therefrom with antenna transducer 202 therein interconnected to transmitter 216 with driver 218, modulator 220 and oscillator 222 to send a signal, whether it be radar or sonar, out to the object being scanned to determine its distance. Such depth or range finders are known in the art. The distance indication signal is sent along line 224 to the Depth and Image Data Synchronizer 172 seen in FIG. 9. Wave guide tube 212, since it "sees" only a small portion of the object at a time, can scan over an object by providing a moving mirror 226 as seen in FIG. 11.

Object 228 can also be scanned by a pair of cameras. If two cameras are used, with first camera 203 above and second camera 205 below the object, first mirror 226 and second mirror 227, respectively, can be directed and moved similarly to the way of moving of mirror 180 in FIG. 9 to thoroughly scan the object quickly. In this way the cameras send not only image data but also depth data to the Depth and Image Data Synchronizer 172 which directs the colored pulsed light beam when that particular portion of the screen desired to be struck has reached the position in depth within the viewing chamber that is needed to produce the visible image point.

The spiral screen, as mentioned above, can be made of a reflective or conductive phosphor-coated material or equivalent such as the mesh material used as the flat screen discussed above. The spiral screen could also be of a type which has a partial conductive silvering which becomes visible when struck by emissions from an electron gun which emissions are directed by the electric field coils as to where they strike the rotating spiral screen for illumination of those points desired. Such spiral screen can be rotated within a transparent vacuum housing.

In one embodiment the rotating and moving mirror 180 as seen in FIG. 12 can be of a type that is positioned on a magnetic support material 186 that is levitated above superconducting material 182 with a ferro magnetic materal 183 on the periphery of the magnetic support material 186 arranged so that mirror 180 floats above superconducting material 182. A plurality of secondary field coils 188 are positioned around and below the periphery of mirror 180 to induce any desired motion to the then levitated mirror 180. In this way there is no friction relating to the movement of mirror 180 since the entire movement of the mirror is controlled by a series of field coils which are directed by the image synchronizer as to the movement of mirror 180. Superconductive material 182 can have liquid nitrogen flowing therethrough through channels 190 so as to make it superconductive. Secondary field coils 188 can be controlled by a series of capacitors 184 which are controlled by Depth and Image Data Synchronizer 172. Capacitor 184 charges secondary field coils 188 to direct the mirror to the desired position so that the beam from laser source 174 hits either rotating spiral screen 160, a flat screen or a moving plane of particles depending upon which mirror system is utilized with any of these types of screen systems. No friction is involved in the movement of the mirror which is controlled by the series of field coils 188 which field coils 188 are directed by the image synchronizer 172 as to the amount of movement of mirror 180 once in position levitated above the superconductive material 182 by the specific attraction when a coil is biased "on" pulling that edge of the levitated mirror nearest the coil downward opposed to the repelling force of the superconductive material and such mirror adapted to return to its original repelled position when the coil is biased "off."

Although the present invention has been described with reference to particular embodiments, it will be apparent to those skilled in the art that variations and modifications can be substituted therefor without departing from the principles and spirit of the invention.

I claim:

1. A three-dimensional imaging system comprising:
 a viewing chamber having a top and bottom and a front opening, length, depth and side height;
 first and second electrode vibration plates positioned at the top and bottom of said viewing chamber;
 means to provide an opposite polarity charge on each of said first and second electrode vibration plates;
 a plurality of minute particles having a changeable charge formed in a narrow plane along the length and depth of said viewing chamber, said plane of particles when near one of said first and second electrode vibration plates being moved by repulsion by changing its charge to the same charge as said nearest electrode vibration plate and then said plane of particles being repulsed to be attached to said other electrode vibration plate of opposite charge where the charge of said particles changes again to be again repulsed to the opposite vibration plate, said particles continuing to change their charge causing said particles to move rapidly in a plane between said first and second electrode plates;
 means to illuminate selected of said particles at a desired position in said viewing chamber;
 a beam source producing a beam sufficient to illuminate said particles directed by said pulsing information; and
 beam aiming means directed by said beam direction information, said beam aiming means directing said beam on said first electrode plate at a position where it is desired to illuminate said selected particles.

* * * * *